3,375,255
N-HYDROXYALKYLPIPERIDYL, PIPERIDYL ALKANES

Francis E. Cislak, Charles K. McGill, and George W. Campbell, Jr., Indianapolis, Ind., assignors to Reilly Tar & Chemical Corporation, Indianapolis, Ind., a corporation of Indiana
No Drawing. Filed Apr. 19, 1965, Ser. No. 449,284
4 Claims. (Cl. 260—294.7)

ABSTRACT OF THE DISCLOSURE

N-hydroxyalkylpiperidyl, piperidyl alkanes are prepared by reacting a chlorohydrin with a dipiperidylalkane, or by reacting a chlorohydrin with di-pyridylalkane and then hydrogenating the resulting quaternary pyridinium salt. Some of them are prepared by reacting an alkylene oxide with a dipiperidylalkane. The compounds are useful in the preparation of corrosion inhibiting compounds and in the polymer art.

---

This invention relates to new compositions of matter. More particularly, it relates to new organic compounds, N-hydroxyalkylpiperidyl, piperidyl alkanes, which compounds have the formula,

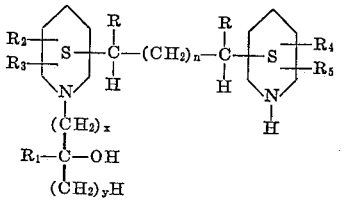

wherein R, $R_1$, $R_2$, $R_3$, $R_4$, and $R_5$ represent hydrogen or lower alkyl, they may be alike or they may be different; $x$ is a small integer from 0 to 4; $y$ is 0, 1, or 2; $n$ is a small integer from 0 to 4.

In general, our new compounds may be prepared by the reaction of a chlorohydrin with an excess of a dipiperidylalkane. Or they may be prepared by the reaction of a chlorohydrin with an excess of a di-pyridylalkane and then catalytically hydrogenating the resulting quaternary pyridinium salt. Some of them may be prepared by reacting an alkylene oxide with an excess of a dipiperidylalkane.

The N-hydroxyalkylpiperidyl, piperidyl alkanes of our invention are amino alkanols. They have the chemical properties associated with amino alkanols and are capable of entering into the same type of reactions as other amino alkanols within the limitations imposed by the piperidine nucleus.

Our N-hydroxyalkylpiperidyl, piperidyl alkanes are useful in the manufacture of compositions having utility as corrosion inhibitors, such as for oil wells, oil refineries, in slushing oils, etc. The reaction product formed by heating (at about 100° C.) one mol of our aminoalkanols with two mols of an alkenyl succinic anhydride, is an ester-amide useful in controlling corrosion in oil wells. The addition of about 100–1,000 p.p.m. of the above ester-amide to the oil well fluids effectively controls corrosion.

When heated with high molecular weight fatty acids—such as stearic, lauric, oleic—our amino alkanols form ester-amides which are water insoluble. These ester-amides are useful as rust prevention coatings.

With polycarboxylic acids, such for example as, adipic, terephthalic, phthalic, sebacic, and the like, our amino-alkanols form polyester-polyamides. These polymers are characterized by the presence of a tertiary nitrogen in their molecular make-up which makes them readily dyeable by acid dyes. The presence of the tertiary nitrogen also improves the adhesion of these polyesters-polyamides to fiber glass.

The manner of carrying out our invention is described in the following specific examples. These examples are given by way of illustration only and are not intended as a limitation of our invention.

EXAMPLE 1

*1-(4-piperidyl)-3-(4-N-beta-hydroxyethylpiperidyl) propane*

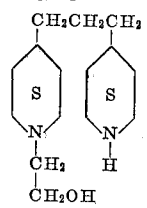

A solution of 315 grams of 1,3-di-(4-piperidyl)propane and 945 grams of isopropanol is placed into a three-liter flask equipped with a stirrer and an inlet tube which extends below the surface of the solution. While stirring the solution, 22 grams of ethylene oxide is gradually added to the solution over a period of two to three hours in the form of a vapor obtained by warming the liquid ethylene oxide on a water-bath. The temperature of the reaction mixture is maintained at about 25–30° C. After all of the ethylene oxide has been added, the solution is stirred for about four hours more. Then the isopropanol is removed by distillation. The 1-(4-piperidyl)-3-(4-N-betahydroxyethylpiperidyl)propane remains as a residue after the isopropanol has been distilled off. It is recovered from this residue by fractional distillation under vacuum. The 1 - (4 - piperidyl) - 3 - (4 - N - beta - hydroxyethyl-piperidyl)propane is a white crystalline solid having a freezing point of about 72° C. and a boiling point of about 250° C. at 15 mm. Hg pressure. It is somewhat soluble in hot water, but insoluble in cold water. It is freely soluble in dilute aqueous acid solutions. Benzene and alcohols are good solvents for the product.

EXAMPLE 2

*1-(2-piperidyl)-3-(2-N-beta-hydroxyethylpiperidyl) propane*

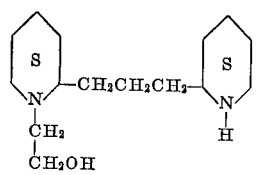

The procedure of Example 1 is repeated with the exception that 1,3-di-(2-piperidyl)propane is used in place of the 1,3-di-(4-piperidyl)propane.

EXAMPLE 3

*1-(3-piperidyl)-3-(3-N-hydroxyethylpiperidyl)propane*

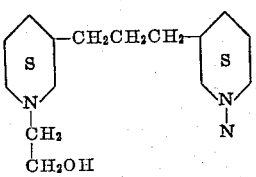

The procedure of Example 1 is repeated with the exception that 1,3-di-(3-piperidyl)propane is used in place of the 1,3-di-(4-piperidyl)propane.

EXAMPLE 4

*1-[2-(6-isopropylpiperidyl)]-3-(4-N-hydroxyethyl-piperidyl)propane*

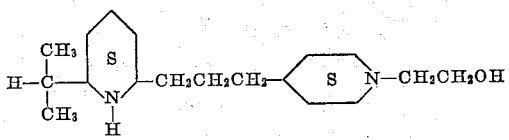

The procedure of Example 1 is repeated with the exception that 400 grams of 1-[2-(6-isopropylpiperidyl)]-3-(4-piperidyl)propane is used in place of the 315 grams of 1,3-di-(4-piperidyl)propane.

EXAMPLE 5

*1-(4-piperidyl)-3-(4-N-beta-hydroxypropylpiperidyl)propane*

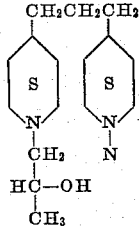

The procedure of Example 1 is repeated with the exception that 29 grams of propylene oxide are used in place of the 22 grams of ethylene oxide.

EXAMPLE 6

*1-(4-piperidyl)-5-(4-N-hydroxyethylpiperidyl)pentane*

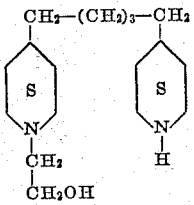

The procedure of Example 1 is repeated with the exception that 400 grams of 1,5-di-(4-piperidyl)pentane is used in place of the 315 grams of 1,3-di-(4-piperidyl)propane.

We claim as our invention:

1. N-hydroxyalkylpiperidyl, piperidyl alkanes whose formula is

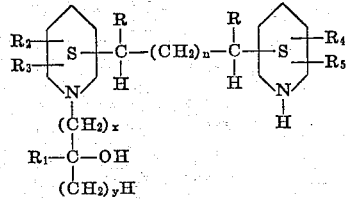

wherein $R$, $R_1$, $R_2$, $R_3$, $R_4$, and $R_5$ are selected from the class consisting of hydrogen and lower alkyl; $x$ is a small integer selected from the group consisting of 0, 1, 2, 3, and 4, $y$ is a small integer selected from the group consisting of 0, 1, and 2, and $n$ is a small integer selected from the group consisting of 0, 1, 2, 3, and 4.

2. 1-(4 - piperidyl)-3-(4-N-betahydroxyethylpiperidyl) propane.

3. 1-(2 - piperidyl)-3-(2-N-betahydroxyethylpiperidyl) propane.

4. 1-(3 - piperidyl)-3-(3-N-betahydroxyethylpiperidyl) propane.

References Cited

UNITED STATES PATENTS 2,972,617   2/1961   Cislak _____ 260—294

JOHN D. RANDOLPH, *Primary Examiner.*

WALTER A. MODANCE, *Examiner.*

A. D. SPEVACK, *Assistant Examiner.*